UNITED STATES PATENT OFFICE.

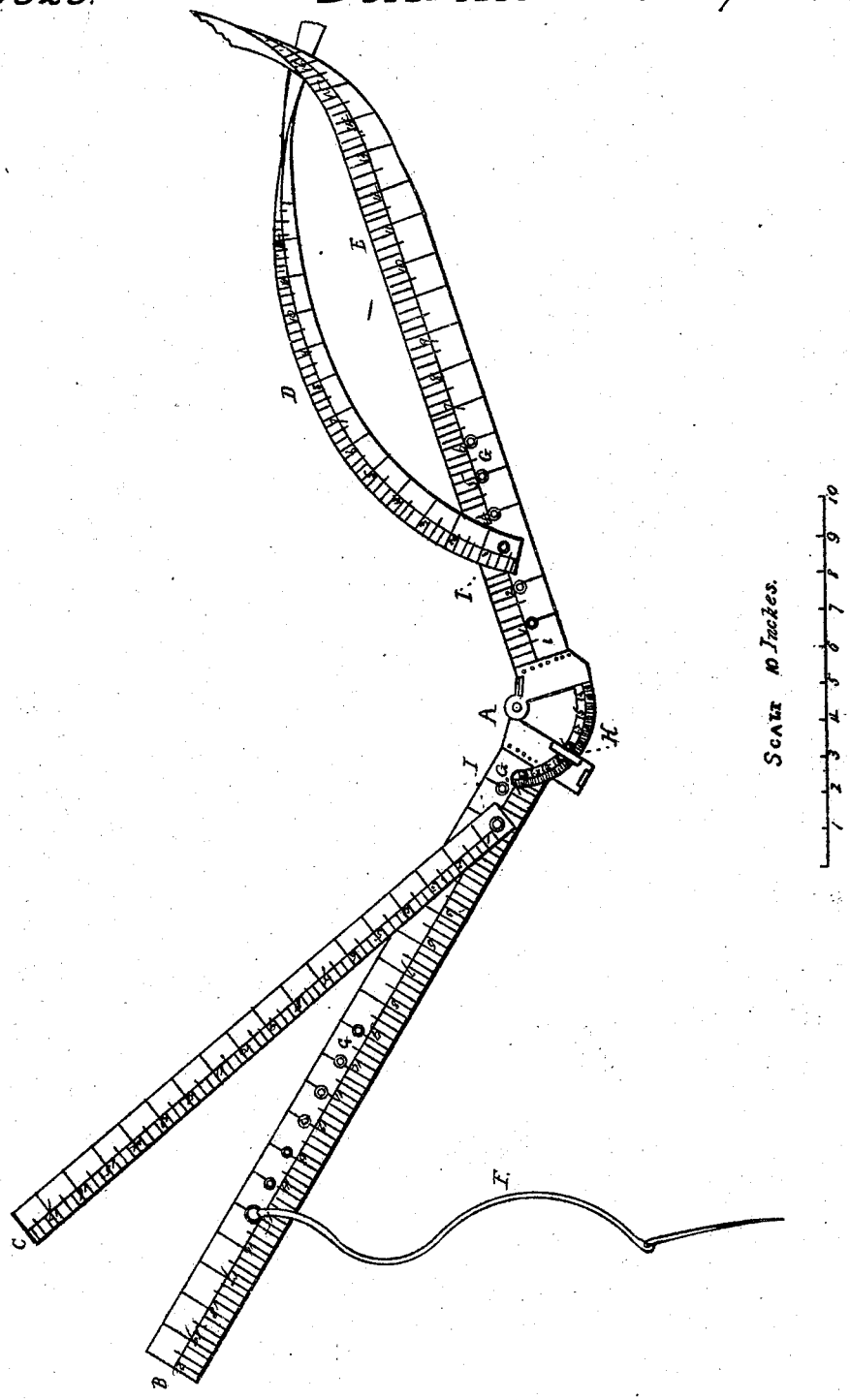

JOHN P. COMBS, OF TRENTON, NEW JERSEY.

TAILOR'S MEASURE.

Specification of Letters Patent No. 3,820, dated November 9, 1844.

*To all whom it may concern:*

Be it known that I, JOHN P. COMBS, of the city of Trenton, in the county of Mercer and State of New Jersey, have invented a new and useful apparatus for measuring gentlemen for coats, vests, &c., and for drafting the same for cutting, which I term mercers' or tailors' angle measure, and do hereby declare that the following is a full description thereof, reference being had to the annexed drawings of the same, making part of this specification.

This apparatus may be made of leather or cloth like the common tape measure, and ought to be about 2 inches wide marked off into degrees of inches and eighths of inches, the numbering commencing in the center thereof, at which place I have a jointed protractor A which must be made of metal and marked off into degrees as aforesaid with a set screw H to keep the instrument in any required position. I also attach to the broad part of this apparatus B and E, and making part of the same, two other measures C and D which may be made of the same material as the broad measure B and E which I make about one inch wide and twenty inches long, and mark off into inches and parts as before described; these measures C and D are attached to the broad measures B and E by means of a screw I passing through eyelet holes G, G, for that purpose and may be moved so as to suit the size of the person measured.

I apply this apparatus to use in the following manner: The protractor A is placed on the breast at the center of the arm, the measure B is passed upward over the shoulder to the back of the neck or to any desired point, and fastened by means of the pin F. The measure B is passed downward and around the arm to the center of the back or any desired point, which position of the two measures B and E opens the jointed protractor A to a point indicated on the circular part of the same by degrees as before described. The set screw H is then forced down upon the same which keeps the jointed protractor in its position, or the degree to which it is opened may be noted in a book for that purpose. The small measure C is then drawn over the point of the shoulder to any desired point on the back. The measure D is drawn back under the arm to any required point in that direction. These several points having been taken, I apply my measure to my cloth and proceed to draft and cut the same into the garment required to be made.

What I claim as my invention and desire to secure by Letters Patent, is—

The jointed protractor A, and the straps or measures C and D attached with screw and eyelet holes as before described, by means of which all the angles necessary to be had in order to insure a perfect fit, are easily and accurately obtained.

JOHN P. COMBS.

Witnesses:
JOSIAH N. BIRD,
JOHN W. TRIMMER.